(12) United States Patent
Floyd et al.

(10) Patent No.: US 6,303,000 B1
(45) Date of Patent: Oct. 16, 2001

(54) PAPER MAKING PROCESS UTILIZING A REACTIVE CATIONIC STARCH COMPOSITION

(75) Inventors: William C. Floyd, Chester; Nolan Thompson; Louis R. Dragner, both of Rock Hill, all of SC (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/143,556

(22) Filed: Aug. 31, 1998

(51) Int. Cl.[7] .................................................. D21H 21/18
(52) U.S. Cl. ........................................ 162/175; 106/206.1
(58) Field of Search .................... 162/175, 158; 106/162.51, 206.1

(56) References Cited

U.S. PATENT DOCUMENTS

| | | | |
|---|---|---|---|
| 2,549,177 | 4/1951 | Davidson | 117/156 |
| 2,867,615 | 1/1959 | Lehmann et al. | 260/233.3 |
| 2,999,032 | 9/1961 | Dekker | 106/213 |
| 3,324,057 | 6/1967 | Suzumura et al. | 260/17.4 |
| 3,740,391 | 6/1973 | Williams et al. | 260/233.3 |
| 3,799,166 | 3/1974 | Marsan | 128/283 |
| 4,002,486 | 1/1977 | Kotani et al. | 106/213 |
| 4,013,629 | 3/1977 | Cummisford et al. | 260/123.7 |
| 4,021,260 | 5/1977 | Crill | 106/213 |
| 4,029,885 | 6/1977 | Buikema | 536/50 |
| 4,060,507 | 11/1977 | Floyd et al. | 260/21 |
| 4,425,452 | 1/1984 | Nakata et al. | 524/47 |
| 4,455,416 | 6/1984 | Floyd et al. | 528/245 |
| 4,461,858 | 7/1984 | Adelman | 524/49 |
| 4,695,606 | 9/1987 | Floyd et al. | 525/160 |
| 4,731,162 | * 3/1988 | Solarek et al. | 162/175 |
| 4,741,804 | * 5/1988 | Solarek et al. | 162/175 |
| 5,032,683 | 7/1991 | Dragner et al. | 536/104 |
| 5,690,790 | * 11/1997 | Headlam et al. | 162/175 |

FOREIGN PATENT DOCUMENTS 2017124    10/1979    (GB).

* cited by examiner

Primary Examiner—Peter Chin
(74) Attorney, Agent, or Firm—Robert F. Rywalski; Daniel J. Hudak

(57) ABSTRACT

A method for manufacturing paper with improved strength by introducing into the paper pulp in the wet end of a paper making process an aqueous starch dispersion of a gelatinized cationic starch and a blocked glyoxal resin.

12 Claims, No Drawings

PAPER MAKING PROCESS UTILIZING A REACTIVE CATIONIC STARCH COMPOSITION

BACKGROUND OF THE INVENTION

The present invention relates to a process for manufacturing paper and more particularly to adding to a dilute paper pulp slurry prior to sheet formation a modified starch dispersion of a cationic starch which has been gelatinized and reacted with a blocked glyoxal resin.

Industrial starch may be utilized in a wide variety of applications including as coatings for paper or paper board and as a bonding wet end additive in papermaking. Starch compositions may desirably be prepared in the form of aqueous dispersions capable of being added to the pulp slurry.

For many commercial applications starch is gelatinized by the end user prior to being used. Gelatinization occurs after starch granules are dispersed as a slurry in water with the resultant aqueous slurry being heated to over 50° C. and usually over about 65° C. Under such conditions starch grains tend to absorb water, swell, and eventually rupture to allow starch fragments and molecules to disperse in water. This rupturing and dispersion is generally referred to as "gelatinization" and is an irreversible reaction resulting in a relatively thick starch dispersion.

The cross-linking of starches with multi functional reagents which are reactive with starch hydroxyl groups is well known. Glyoxals and polyaldehyde compounds and resins have been previously utilized as cross-inkers. The simple mixing of glyoxal with a starch dispersion will provide a gel. U.S. Pat. No. 4,455,416 describes a paper coating containing starch binder and a cyclic urea/glyoxal/polyol condensate as an insolubilizer for the binder. As an insolubilizer the glyoxal condensate is inactive until the coating is applied and cured upon drying whereupon the glyoxal crosslinks the starch to impart water resistance. U.S. Pat. No. 4,021,260 describes ethoxylated fatty alcohols as starch viscosity control agents. U.S. Pat. No. 3,324,057 discloses the use of dialdehyde starch in the preparation of paper coatings. U.S. Pat. No. 3,740,391 describes the production of aqueous dispersions of a starch first reacted with an acrylamide and, subsequently, with glyoxal. U.S. Pat. No. 4,013,629 discloses a glyoxal binder system. U.S. Pat. No. 4,425,452 discloses coating paper material via an enzymatically converted starch. British Patent No. 2017124 discloses polysaccharides cross-linked with glyoxal.

A stable fluid aqueous modified starch dispersion is prepared in U.S. Pat. No. 5,032,683, the disclosure of this patent being incorporated herein by reference. This starch dispersion is prepared by gelatinizing an aqueous slurry of a starch and reacting with a glyoxal compound. The present invention has found that a cationic starch dispersion modified with blocked glyoxal resin when added in the wet end of a papermaking process provides significant improvements in strength to the resultant paper.

BRIEF DESCRIPTION OF THE INVENTION

It is an object of this invention to provide a process of manufacturing paper having improved strength.

This and other objects are achieved by introducing into the paper pulp in the wet end of a papermaking process an aqueous starch dispersion of a gelatinized cationic starch and a blocked glyoxal resin.

DETAILED DESCRIPTION OF THE INVENTION

An aqueous cationic starch dispersion modified with a blocked glyoxal resin is prepared which is readily flowable and wherein gelation and viscosity increases over time are inhibited. The starch dispersion is prepared by gelatinizing an aqueous suspension or slurry of starch granules and adding, preferably reacting the starch with a blocked glyoxal resin at temperatures of at least 70° C., preferably 85 to 95° C. Preferably gelatinization and the reaction with the blocked glyoxal resin are carried out simultaneously, although the starch can be pre-gelatinized and then reacted with the glyoxal compound with heating.

It is theorized that by reacting gelatinized starch at the higher temperatures with the blocked glyoxal resin the amylose is derivitized with the glyoxal so that retrogradation of the amylose and the formation of amylose fatty acid complexes upon cooling is inhibited, resulting in aqueous dispersions having a flowable viscosity and in which gelation and viscosity increases over time are inhibited. Without intending to be bound by theory it is believed that the glyoxals react with amylose to make highly labile hemi-acetals which disrupt the crystallinity of amylose, thus significantly inhibiting retrogradation. Further, it is believed that glyoxal added after gelatinization and cool-down does not form hemi-acetals with the same efficiency as those added during heating because after gelatinization and cool-down crystallization occurs which limits the sites of reaction with glyoxal. Further, the use of a blocked glyoxal resins provides improved starch rheology reducing the tendency for gelling and is less prone to retrogradation and precipitation.

The starch dispersion prepared according to this invention will generally have a viscosity of less than 1000 cps, preferably less than 350 cps. Except where otherwise indicated, viscosity readings set forth herein are taken in aqueous solution at 35% solids content (by weight), are Brookfield viscosities (RV, #3 spindle at 100 rpm), and viscosity readings are taken at room temperature.

Suitable blocked glyoxal resins which may be used in accordance with the invention are described in U.S. Pat. No. 4,695,606 and include but are not limited to cyclic urea/glyoxal/polyol condensates, polyol/glyoxal condensates, urea or cyclic urea/glyoxal condensates and glycol/glyoxal condensates. The amount of glyoxal compound may be adjusted within broad limits, but is generally from about 3% to about 30%, preferably 9 to 20%, of the total dry weight of starch (and/or derivatives thereof) present.

In accordance with the invention, an aqueous slurry of cationic starch is prepared. Preferably the starch is an amylose containing starch. The starch may be obtained from any conventional source, including potato, corn, waxy corn, red milo, white milo, wheat and tapioca and may be pearl or lightly thinned and may have been oxidized, hydroxyalkylated, acid modified, enzyme converted or various combinations thereof. Also, suitable to this invention are thin-boiling starches that have been additionally chemically modified to reduce the setback or retrogradation tendencies of the starch. The prior art describes methods for making a wide variety of starch derivatives that display reduced setback. Higher molecular weight starches are preferred because of greater strength than low molecular weight starches. In certain preferred embodiments a blend of hydroxyethylated starch and an acid and/or enzyme-converted starch may be utilized with cationic starch. For example, cationic corn or potato starch may be utilized together with an acid modified or an oxidized hydroxyethylated starch such as a hydroxyethylated potato starch.

It is important for the starch to contain cationic functionality to enhance retention on the anionic paper fibers. Such functionality is commonly introduced via tertiary or quaternary amino groups appended to the starch.

Preferably, the blocked glyoxal resin is added to the aqueous starch slurry and the slurry is heated to about 90° C. for at least about 30 minutes to gelatinize the starch. The starch slurry and blocked glyoxal resin may be heated briefly to higher temperatures such as those obtained with a steam injection cooker. The heat beneficially drives the reaction of the blocked glyoxal resin and starch simultaneously with starch gelatinization. The resulting gelatinized starch composition is then preferably treated with a biocide if it will be stored, preferably after it has been allowed to cool to about 40° C. Biocide is preferably added at a concentration by weight, of about 10 ppm to about 500 ppm. Suitable biocides include Kathon® LX from Rohm & Haas which is a mixture of 5-chloro-2-methyl-4-isothiazolin-3-one and 2-methyl-4isothiazolin-3-one and Proxel® GXL from ICI which is 1,2 benzothiazolin-3-one. Gelatinization in the presence of the glyoxal resin preferably takes place in an aqueous slurry at a solids content between about 15% and about 50% by weight, preferably between about 25% and about 35%. In alternative methods, dry starch and dry glyoxal resin may be intermixed prior to introduction into an aqueous slurry for the gelatinization and/or reaction steps.

Typically, an aqueous slurry of the granular cationic starch is prepared, and the blocked glyoxal resin is added to the agitated slurry. The starch is then gelatinized, or cooked out, either in a batch process or by a jet cooker. The cationic starch glyoxal resin condensate dispersion is then added to the dilute pulp slurry prior to sheet formation and thoroughly fixed. Generally the starch dispersion is added to the pulp slurry at a level of 2 to 50 lbs. dry starch, preferably 5 to 20 lbs. dry starch, per ton of dry pulp. The resin is attached to the cationic starch, which is attracted to the anionic pulp fibers thereby introducing the resin to the fiber. The sheet of paper is then formed, containing both the cationic starch and the resin. Upon drying the sheet, the resin reacts further with the cationic starch and/or cellulosic fiber, resulting in improved sheet properties such as wet tensile.

Polyacrylamide and acrylamide copolymers can also be added to improve tensile strength of the starch films drawn down from these compositions. These polymers also react with glyoxal to form a polymer-reinforced starch film upon drying. Generally the acrylamide polymer or acrylamide copolymer is added at a level of up to 50% by weight of the blocked glyoxal resin. The acrylamide is preferably a copolymer of acrylamide and is water soluble.

The invention is further illustrated by the following examples which are set forth only as illustrations of the invention and not as limitations thereof.

EXAMPLE I

An acid-modified corn starch (Keofilm® 90, available from Hubinger Corporation) was selected for film studies. As a control, a 20% solution of Keofilm® 90 was prepared, heated to 90° C. for 30 minutes, then cooled. A film, Sample A, was drawn down on Mylar, then dried and cured for 2 minutes at 250° F.

A second batch of Keofilm® 90, identical to the first, was prepared. Upon cooling, 10% by dry weight of a blocked glyoxal resin (Sequex®R) was added and thoroughly mixed. A film, Sample B was drawn down on Mylar, then dried and cured for 2 minutes at 250° F.

A third batch of Keofilm® 90 was prepared, identical to the first, except that the 10% of blocked glyoxal resin (Sequex®R) was added before the starch was heated. After cooking at 90° C. for 30 minutes, the starch dispersion was cooled, and a film drawn down on Mylar. This film, Sample C, was then dried and cured for 2 minutes at 250° F. All 3 films were tested for tensile and elongation on an Instron Model 1110 Tensile Tester (films where 2 inches×7/16 inches and 12–13 mil. thick) with the results as shown in Table 1.

TABLE 1

| Sample | Dry Tensile (Kg) | Dry Elongation (%) | Wet Tensile (Kg) | Wet Elongation (%) |
|---|---|---|---|---|
| A | 7.19 | 5.6 | 0.11 | 3.72 |
| B | 8.82 | 5.6 | 1.81 | 8.26 |
| C | 9.42 | 6.1 | 1.98 | 8.94 |

Table 1 shows the benefits of this invention in that Sample C showed greater wet and dry tensile strength and elongation. The improved strength performance obtained by this invention for the starch films has also been observed in waxy starches which do not contain amylose.

EXAMPLE II

The presence of the blocked glyoxal resin in the paper sheet may be determined by the improved sheet properties or calorimetrically. A dilute solution of N-methyl benzo thiazolinone hydrazone hydrochloride (MBTH) when spotted on the paper and warmed will evolve a yellow coloration if glyoxal or glyoxal based resins are present. If the glyoxal compound and cationic starch are merely mixed together, or added separately to the pulp slurry, inferior results are obtained.

The following examples are provided to illustrate this invention. Hand sheets were made using a 50/50 hardwood/softwood fiber blend. The freeness was held at approximately 370–350 at 1.5% consistency and adjusted to ph 4.5 with sulfuric acid. The hand sheet were made using 250 g of cellulose paper pulp to produce a 3.5 g hand sheet. Test samples were selected based on sample weight.

An aqueous slurry of Sta-lok® 400 (a cationic potato starch from A. E. Staley Mfg. Co.) was prepared at 4% solids. To this was added 9% (dry on dry) Sequex®R (a cyclic urea/glyoxal condensate, 45% solids, from Sequa Chemicals, Inc.). This was agitated and heated to 90° C. for 30 minutes to afford a clear amber solution which thickened upon cooling. Sufficient quantities of this were added to pulp slurries so as to achieve the equivalent of 40, 60 and 80 pounds of cationic starch per ton of pulp. Sheets of each dosage were prepared in triplicate. For controls, handsheets were prepared with no additives, and with cationic starch only at the equivalent of 40, 60 and 80 pounds of cationic starch per ton of pulp.

The results show that this invention provides an improvement in dry tensile, a substantial improvement in wet tensile and superior Mullen burst strength compared to the controls. Testing was done on 1×4 inch strips of paper on an Instrum Model 1100 Tensile Tester.

| Additive Dosage | | Cationic Starch | | | Cationic Starch/Resin | | |
|---|---|---|---|---|---|---|---|
| Average | None | 40 | 60 | 80 | 40 | 60 | 80 |
| Sheet wt, g | 3.2 | 3.6 | 3.6 | 3.6 | 3.3 | 3.7 | 3.7 |
| Tensile, Dry, kg | 15.4 | 17.8 | 17.5 | 17.4 | 13.9 | 18.5 | 22.4 |
| % stretch | 4.9 | 4.7 | 5.0 | 5.4 | 4.9 | 5.3 | 5.6 |
| Wet, kg | 0.36 | 0.54 | 0.76 | 0.90 | 0.8 | 1.1 | 1.4 |
| % stretch | 2.3 | 2.7 | 3.4 | 3.7 | 3.6 | 3.7 | 4.4 |
| Tabor Stiffness | 3.7 | 4.4 | 8.2 | 2.8 | 2.8 | 3.7 | 4.1 |
| Mullen Burst | 60.4 | 82.6 | 72.4 | 66.6 | 65.4 | 82.8 | 80.2 |
| Hercules Size Test, sec | 1.0 | 0.8 | 0.7 | 0.8 | 0.2 | 0.4 | 0.3 |

EXAMPLE III

A series similar to that described in Example II was prepared consisting of a base sheet with no additives, (A) a set with cationic starch applied at a rate equivalent to 40, 60 and 80 pounds per ton, (B) a set with 9% blocked glyoxal resin (Sequex®R, dry resin on starch) reacted with the cationic starch and applied at a rate of 40, 60 and 80 pounds of cationic starch per ton of pulp, (c) a set similar to B except that the amount of blocked glyoxal reacted with the cationic starch was 12% (dry on dry), and (D) a set similar to B except that the amount of blocked glyoxal resin reacted with the cationic starch was 20% (dry on dry). The appropriate amount of starch was added to the pulp slurry and mixed, then handsheets were formed and dried on a rotary drier. Three handsheets for each formulation were tested and average results are reported on attached sheets.

These results show that higher levels of resin may not be beneficial and that the system may be overdosed. The 9% level of resin gives the best overall performance, particularly at the 60 and 80 pound per ton levels. It should be noted that as the level of cationic starch increased in A, wet tensile increases while Mullen Burst strength decreases, and dry tensile is level. With the B set of samples, as the level cationic starch increases, dry tensile increases, wet tensile increases and Mullen Burst Strength rises and stays high.

EXAMPLE IV

This example sought to examine the effect of different modes of combining the blocked glyoxal resin with the cationic starch and their introduction to the pulp slurry. A set of control base sheets was made having no additives followed by (A) a series in which cationic starch was added to the pulp slurry at the equivalent dosages of 40, 60 and 80 pounds per ton. A similar series (B) followed in which 9% of the blocked glyoxal resin was cooked out with the starch at 90° C. for 30 minutes. This was followed by a series, (c) in which the starch was cooked out then cooled to 50° C., where upon the blocked glyoxal resin was stirred in. A final series (D) was prepared in which the cationic starch was cooked out then added to the pulp slurry. The blocked glyoxal resin was then added to the pulp slurry. Handsheets were formed from these slurries and dried on a rotary drier. Sheets were tested as before with results shown as follows.

These results show that reacting the resin with the cationic starch during the gelatinization is the preferred process. Some reaction apparently does take place when the starch is first cooked out and cooled prior to introducing the resin. This procedure is less efficient in that it requires a dosage of 80 pounds per ton to achieve performance equivalent to 60 pounds per ton prepared by the preferred procedure. The 80 pound per ton samples of set B are lower than expected, which may indicate poor mixing. Set D gives inferior results similar to set A with cationic starch only. This indicates that very little resin was retained on the fiber.

| Addition | | A | | | B | | |
|---|---|---|---|---|---|---|---|
| Conditions | Base | 40 | 60 | 80 | 40 | 60 | 80 |
| Dry Tensile | 12.3 | 13.75 | 14.84 | 14.3 | 16.64 | 18.01 | 16.1 |
| % Dry Stain | 4.05 | 4.2 | 4.1 | 4.1 | 4.8 | 7.84 | 4.8 |
| West Tensile | .244 | .57 | .21 | .234 | .79 | .965 | .792 |
| % Wet Strain | 3.04 | 3.41 | 3.2 | 3.2 | 3.83 | 4.03 | 3.68 |
| Mullens Burst | 38.4 | 53.4 | 54 | 56 | 58.8 | 62 | 58.2 |

| | A | | | B | | | C | | | D | | |
|---|---|---|---|---|---|---|---|---|---|---|---|---|
| Base | 40 | 60 | 80 | 40 | 60 | 80 | 40 | 60 | 80 | 40 | 60 | 80 |
| Dry Tensile | 15.4 | 17.6 | 17.48 | 17.41 | 13.9 | 18.5 | 22.36 | 15.7 | 17.0 | 16.6 | 18.58 | 16.74 | 19.7 |
| % Dry Strain | 4.89 | 4.7 | 4.98 | 5.4 | 4.9 | 5.26 | 5.65 | 4.3 | 4.53 | 5.06 | 4.98 | 4.36 | 4.47 |
| Wet Tensile | .36 | .543 | .76 | .905 | .82 | 1.1 | 1.39 | .95 | .93 | 1.01 | .757 | 1.14 | 1.4 |
| % Wet Strain | 2.3 | 2.68 | 3.42 | 3.67 | 3.6 | 3.67 | 4.4 | 4.04 | 4.1 | 4.3 | 3.72 | 4.6 | 3.9 |
| Mullen Burst | 60.4 | 82.6 | 72.4 | 66.6 | 65.4 | 82.8 | 80.2 | 6.7 | 78.4 | 70.6 | 78.6 | 66.8 | 73.2 |

Base Sheet-No Additives
A. STA-LOK 400 only
B. STA-LOK 400 plus 9% Sequez ® R (Converted 210° F.)
C. STA-LOK 400 plus 12% Sequez ® R (Converted 210° F.)
D. STA-LOK 400 plus 20% Sequez ® R (Converted 210° F.)

-continued

| Conditions | Base | 40 | 60 | 80 | 40 | 60 | 80 |
|---|---|---|---|---|---|---|---|
| Dry Tensile | 12.3 | 13.75 | 14.94 | 18.21 | 15.05 | 13.63 | 13.10 |
| % Dry Stain | 4.05 | 4.7 | 4.6 | 4.7 | 4.77 | 4.88 | 4.45 |
| West Tensile | .244 | .669 | .49 | .977 | .662 | .687 | .525 |
| % Wet Strain | 3.04 | 3.5 | 3.74 | 4.11 | 3.43 | 3.58 | 3.51 |
| Mullens Burst | 38.4 | 51.6 | 63.4 | * | 51.4 | 4.6.6 | 47.1 |

The terms and descriptions used herein are preferred embodiments set forth by way of illustration only, and are not intended as limitations on the many variations which those of skill in the art will recognize to be possible in practicing the present invention as defined by the following claims.

What is claimed is:

1. A method for manufacturing paper sheet comprising:
   adding to a paper pulp slurry in the wet end of a paper making machine an aqueous reaction product of a cationic starch and a blocked glyoxal compound, wherein said reaction occurs during the gelatinization of said starch and prior to said addition;
   forming the paper sheet; and
   drying the paper sheet.

2. Method of claim 1 wherein the cationic starch is selected from the group consisting of potato starch, cornstarch and wheat starch.

3. Method of claim 1 wherein the amount of glyoxal resin is within the range of 3 to 30% of the dry weight of the starch.

4. Method of claim 3 wherein the amount of glyoxal resin is within the range of 9 to 20% of the dry weight of the starch.

5. Method of claim 1 wherein the glyoxal resin is selected from the group consisting of polyol/glyoxal condensate and cyclic urea/glyoxal condensate.

6. Method of claim 1 wherein the said reaction product is added to the paper slurry at a level of 2 to 50 pounds dry starch per ton of dry pulp.

7. A method for manufacturing paper comprising:
   adding an aqueous reaction product of a cationic starch and a blocked glyoxal compound to a paper pulp slurry in a wet end of a paper making machine, wherein said reaction occurs during gelatinization of said starch and prior to said addition;
   forming paper; and
   drying the paper.

8. A method according to claim 7, wherein the cationic starch is selected from the group consisting of potato starch, cornstarch and wheat starch.

9. A method according to claim 7, wherein the amount of glyoxal resin is within the range of 3 to 30% of the dry weight of the starch.

10. A method according to claim 9, wherein the amount of glyoxal resin is within the range of 9 to 20% of the dry weight of the starch.

11. A method according to claim 10, wherein the glyoxal resin is selected from the group consisting of polyol/glyoxal condensate and cyclic urea/glyoxal condensate.

12. A method according to claim 11, wherein the said reaction product is added to the paper slurry at a level of 2 to 50 pounds dry starch per ton on dry pulp.

* * * * *